US007212309B1

(12) United States Patent
Sellers et al.

(10) Patent No.: US 7,212,309 B1
(45) Date of Patent: May 1, 2007

(54) BEST FIT PRINTING

(75) Inventors: Timothy D. Sellers, Bellevue, WA (US); Nam-Yul Kwon, Issaquah, WA (US); John D. Griffin, Seattle, WA (US); Christopher H. Pratley, Seattle, WA (US); Owen C. Braun, Seattle, WA (US); Peter L. Engrav, Seattle, WA (US); Stuart J. Stuple, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 10/233,060

(22) Filed: Aug. 30, 2002

(51) Int. Cl.
  *B41J 29/42* (2006.01)
  *G06F 15/18* (2006.01)
  *G06F 17/00* (2006.01)
  *G06K 1/00* (2006.01)

(52) U.S. Cl. .................. 358/1.2; 358/1.18; 345/668; 715/517; 715/521

(58) Field of Classification Search ................ 715/815
  See application file for complete search history.

(56) References Cited

U.S. PATENT DOCUMENTS

| | | | | |
|---|---|---|---|---|
| 6,414,698 | B1 * | 7/2002 | Lovell et al. | 715/800 |
| 6,547,830 | B1 * | 4/2003 | Mercer | 715/518 |
| 6,603,493 | B1 * | 8/2003 | Lovell et al. | 715/800 |
| 6,922,260 | B2 * | 7/2005 | Nishikawa et al. | 358/1.18 |
| 2003/0226113 | A1 * | 12/2003 | Altman et al. | 715/520 |
| 2006/0028659 | A1 * | 2/2006 | Nishikawa | 358/1.2 |
| 2006/0209318 | A1 * | 9/2006 | Tonegawa | 358/1.2 |
| 2006/0250621 | A1 * | 11/2006 | Cochran et al. | 358/1.2 |

OTHER PUBLICATIONS

Poupyrev, Ivan et al., "Virtual Notepad: Handwriting in Immersive VR", *IEEE*, 1998, pp. 126-132.
Campbell, George, "The Write Stuff: 15 Essential Tips for Smarter, Faster Word Processing-No Matter Which Version of Word or WordPerfect You Use", *PC World*, vol. 20, No. 2, Feb. 2002, pp. 7, 10, 93-98.
Antonacopoulos, A., "Page Segmentation Using the Description of the Background", *Computer Vision and Image Understanding*, vol. 70, No. 3, Jun. 1998, pp. 350-369.
U.S. Appl. No. 10/180,231, filed Jun. 26, 2002, entitled "Automatically Sized Computer-Generated Workspaces", Inventors: Stuple et al.
U.S. Office Action U.S. Appl. No. 10/180,231, entitled "Automatically Sized Computer-Generated Workspaces", filed Jun. 26, 2002, Inventors: Stuart J. Stuple, Owen C. Braun, Christopher H. Pratley, Alex J. Simmons, and Timothy D. Sellers.
U.S. Appl. No. 10/180,231, entitled "Automatically Sized Cmputer-Generated Workspaces," filed Jun. 26, 2002, Inventors: Stuart J. Stuple, Owen C. Braun, Christopher J. Pratley, Alex J. Simmons, Timothy D. Sellers.
U.S. Office Action mailed May 22, 2006, in U.S. Appl. No. 10/180,231, filed Jun. 26, 2002, Inventors: Stuart J. Stuple, Owen C. Braun, Christopher H. Pratley, Alex J. Simmons, Timothy D. Sellers.

* cited by examiner

*Primary Examiner*—Twyler Lamb
*Assistant Examiner*—Myles D. Robinson
(74) *Attorney, Agent, or Firm*—Merchant & Gould

(57) ABSTRACT

Methods and systems are provided for automatically adjusting printing settings to optimize the fit of text, data and/or images on printed pages. Once selected text or data is designated for printing, a determination is made as to whether the selected text or data may be printed on a single page or whether multiple pages are required. The best fit of the text or data on a single or multiple pages is accomplished by incrementally adjusting a number of different print settings until an optimum fit of the text or data is achieved on a single page or on a set of pages. Print settings include margins, scale, and orientation.

29 Claims, 11 Drawing Sheets

BEST FIT PRINTING

FIELD OF THE INVENTION

The present invention relates to methods and systems for automatically adjusting printing settings to optimize the fit of text, data and/or images on printed pages.

BACKGROUND OF THE INVENTION

Computer software applications allow users to create a variety of documents to assist them in work, education, and leisure. Popular word processing applications allow users to create letters, articles, books, memoranda, and the like. Spreadsheet applications allow users to store, manipulate, print, and display a variety of alpha-numeric data. Handwriting recognition applications allow users to hand write text, data and/or images into a data entry area of their computer.

Many of such software applications allow users to type or write text or data into the data entry area in a free form manner without regard to particular margins or data size. That is, with many modern applications, a user may type or hand write notes, text, images, data and the like at various locations in the data entry area. One disadvantage to such free form text or data entry is associated with printing. If text or data entered by the user extends beyond the printable margins as dictated by the printer software or hardware limitations, or as designated by the user, that text or data may be printed on a separate page. This outcome is particularly undesirable when a portion of a single line of text or a portion of an image is "chopped" off a first printed page only to be printed on a second page away from the context of the text or image to which it belongs.

It with respect to these and other considerations that the present invention has been made.

SUMMARY OF THE INVENTION

The present invention provides methods and systems for automatically adjusting printing settings to optimize the fit of text, data and/or images on printed pages. Text, data and/or images are entered into a computer controlled data entry area via a software application such as a word processor or handwriting recognition application. Upon the selection of the text, data or images for printing, a determination is made as to default settings for paper orientation (portrait vs landscape), margins and scale as designated by the user of the application. Printer dictated minimums are determined so that printed text or data may not go beyond margins allowed by the printer software and hardware.

Once the selected text or data is designated for printing, a determination is made as to whether the selected text or data may be printed on a single page if any unused space around the selected text or data is removed and if the margins, orientation and scaling of the text or data is set to allow the maximum amount of the selected text or data to be printed on a single page. If the determination is made that the text or data may be printed on a single page, a series of steps may be performed to optimize the printing of the text or data on the single page in order to achieve a best fit of the text or data on the page when printed.

Steps performed include removing unused space surrounding text or data, reducing the right margin, reducing the bottom margin, reducing the left margin, and reducing the top margin. If the text or data does not fit on the single page after each margin adjustment, the scale of the text may be reduced followed by further adjustments to the margins up to the minimum margins allowed according to the printer software and hardware limitations. If the text or data still will not fit on the single page, all printer settings are reset to the original setting and the page orientation is changed to a different setting, for example from portrait to landscape. Once the orientation of the paper is changed, adjustments to the margins and scale are made until all the text or data is printable on a single page or until a determination is made that the text or data still will not fit on a single page. If the text or data will not fit on a single page after all print setting adjustments are attempted, the scale of the text or data is reduced again until the text fits on a single page.

If prior to all print setting adjustments a determination is made that the text or data will not fit on a single page even if all unused space is removed and margins, orientation and scaling are adjusted to minimum values acceptable by the printer software and hardware, the printer settings are adjusted to achieve the best fit of the text or data on multiple pages. Once the determination is made that the text or data will be printed on multiple pages, the right margins for all pages are reduced in order to fit the text or data on the multiple pages. If the text or data will not fit on the multiple pages after margin reduction, the scale of the text or data is reduced in order to fit the text or data on the multiple pages. If the text or data still does not fit on the multiple pages, the text or data is then adjusted on each of the multiple pages individually, as set out above, to fit text or data designated for each individual page on to that individual page. In the case of multiple page printing, where the orientation of the multiple pages is mixed, that is, some pages are designated for portrait orientation and some pages are designated for landscape orientation, further print setting adjustments are performed in order to maximize the number of pages to be printed according to one orientation type.

These and other features, advantages, and aspects of the present invention may be more clearly understood and appreciated from a review of the following detailed description of the disclosed embodiments and by reference to the appended drawings and claims.

DETAILED DESCRIPTION

The following description of embodiments of the present invention is made with reference to the above-described drawings wherein like numerals refer to like parts or components throughout the several figures. The present invention is directed to methods and systems for automatically adjusting print settings to optimize the fit of text, data, and/or images of printed pages.

Figure 1:
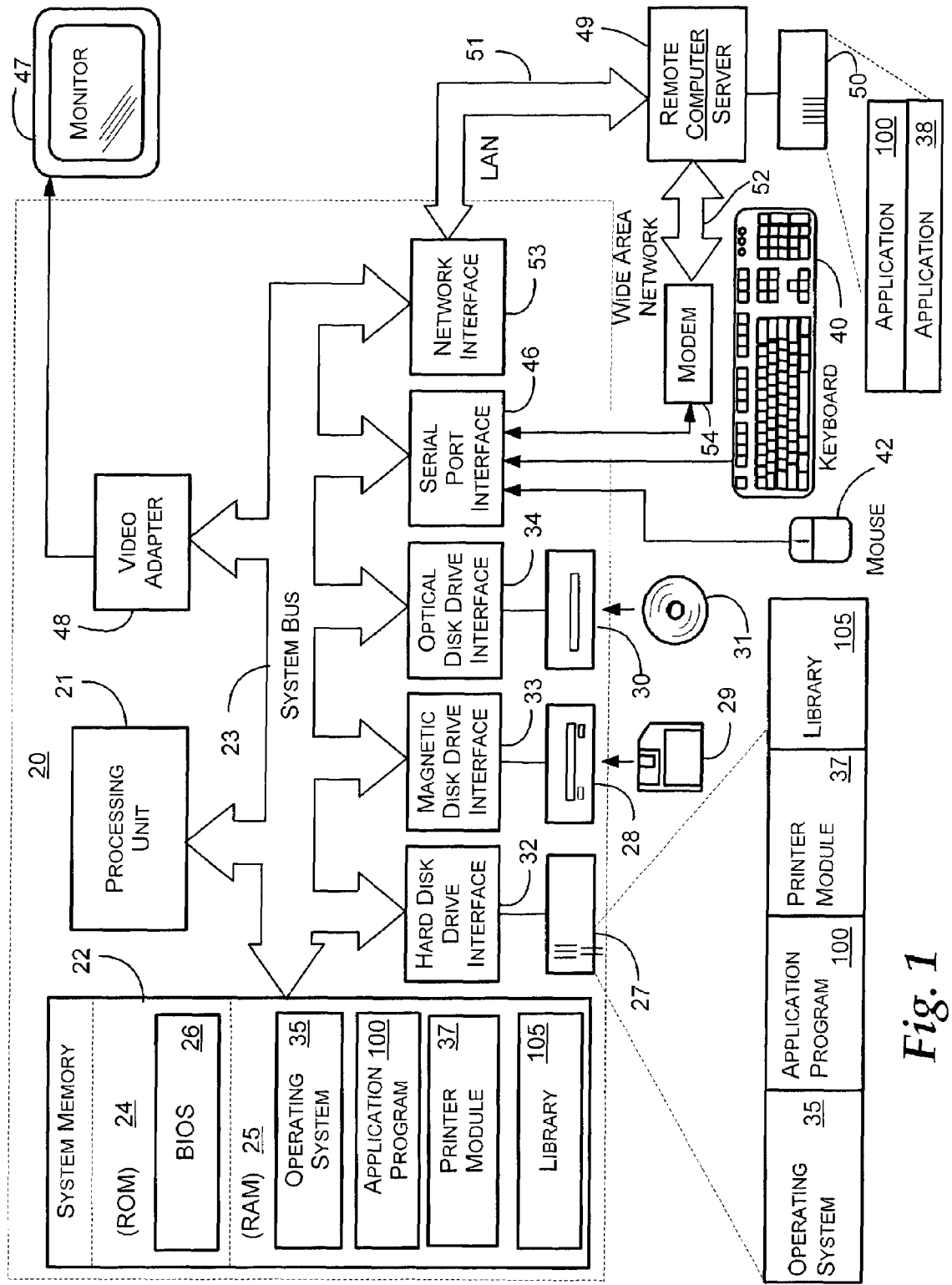
FIG. 1 is a diagram of a computer and associated peripheral and networked devices that provide and exemplary operating environment for the present invention.

FIG. 1 is a diagram of a computer and associated peripheral and networked devices that provide and exemplary operating environment for the present invention. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, such as a handwriting recognition application or a word processor application. A printer program module 37 is also illustrated. According to an embodiment of the present invention, the printer program module 37 is responsible for optimizing the fit of text, data or images on printed pages in concert with an application program such as the application program 100.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
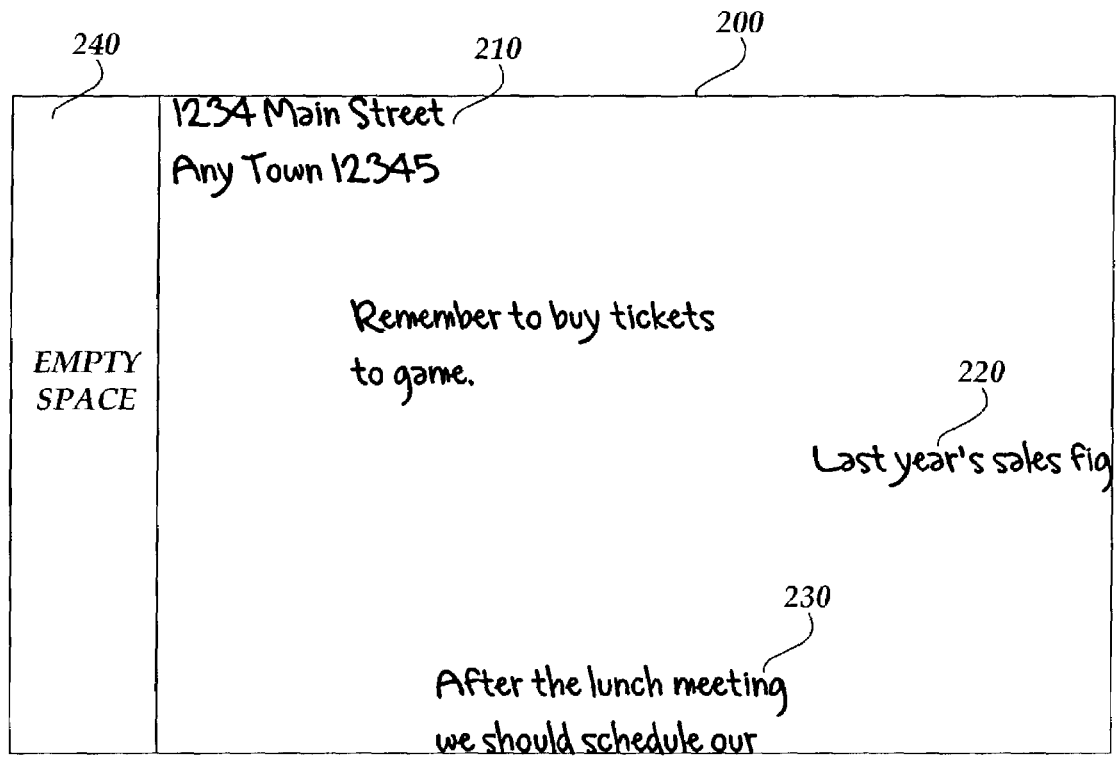
FIG. 2 illustrates a printed page of text entered and printed via a handwriting recognition application into a computerized data entry area.

FIG. 2 illustrates a printed page of text entered and printed via a handwriting recognition application into a computerized data entry area. A printed page 200 is illustrated in FIG. 2 showing printed handwritten text at various locations on the printed page 200. For example, near the upper margin of the printed page is a portion of an address 210. On the right side is a printed portion of a sentence 220, and bottom margin is a printed portion of a paragraph 230. Near the left margin of the printed page is an area of empty space 240. The printed page 200 is illustrative of a page of printed handwritten text entered and printed via a handwriting recognition software application 100. The printed page 200 is also illustrative of a printed page of text, data, or images input by a user of other applications including word processors, notepad applications, spread sheet applications, or any other application allowing a user to enter text, data and/or images into a data entry area and allowing the user to print the text, data, or images on a printed page, such as the printed page 200.

As shown in FIG. 2, the handwritten text entered by the user has been entered at locations such that all the handwritten text will not print on a single page. That is, a portion of the address 210 is beyond the upper margin, a portion of the sentence 220 is beyond the right margin, and a portion of the paragraph 230 is beyond the bottom margin. The empty space 240 has been printed on the printed page 200 because the user started the first text, the address 210, at a position such that the empty space 240 is left between the left side of the address 210 and the left margin of the printed page 200.

Figure 3:
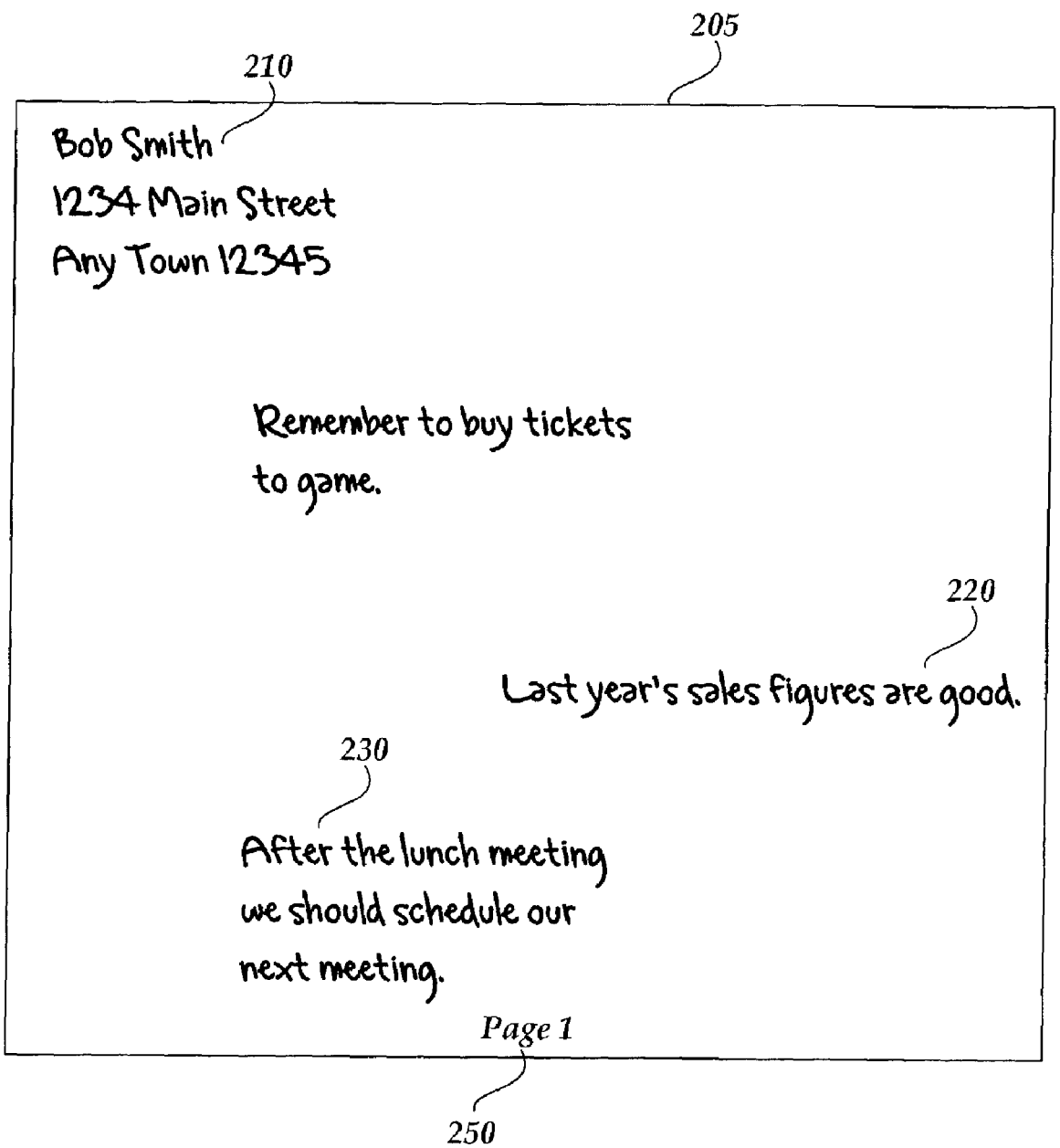
FIG. 3 illustrates a printed page of text entered and printed via a handwriting recognition application where the fit of the text for printing has been optimized according to the present invention.

FIG. 3 illustrates a printed page of text entered and printed via a handwriting recognition application where the fit of the text for printing has been optimized according to the present invention. The printed page 205 illustrates a printed page containing the same handwritten text printed on the printed page 200, illustrated in FIG. 2, but after the print settings have been automatically adjusted to optimize the fit of the text so that all the text fits on the single printed page 205. For example, as shown in FIG. 3, the address 210 fits underneath the top margin. The sentence 220 fits within the right margin. The paragraph 230 fits above the bottom margin. And, a footer giving the page number now fits above the bottom margin. Additionally, the unused empty space 240, illustrated in FIG. 2, has been removed from the printed page 205. According to embodiment of the present invention, in order to optimize the fit of the text, data, or images on printed pages, as illustrated in FIG. 3, print settings such as printing scale, orientation, margins, headers, footers, and page numbering are automatically adjusted in an attempt to optimize the fit of text, data, and images on printed pages.

Figure 4:
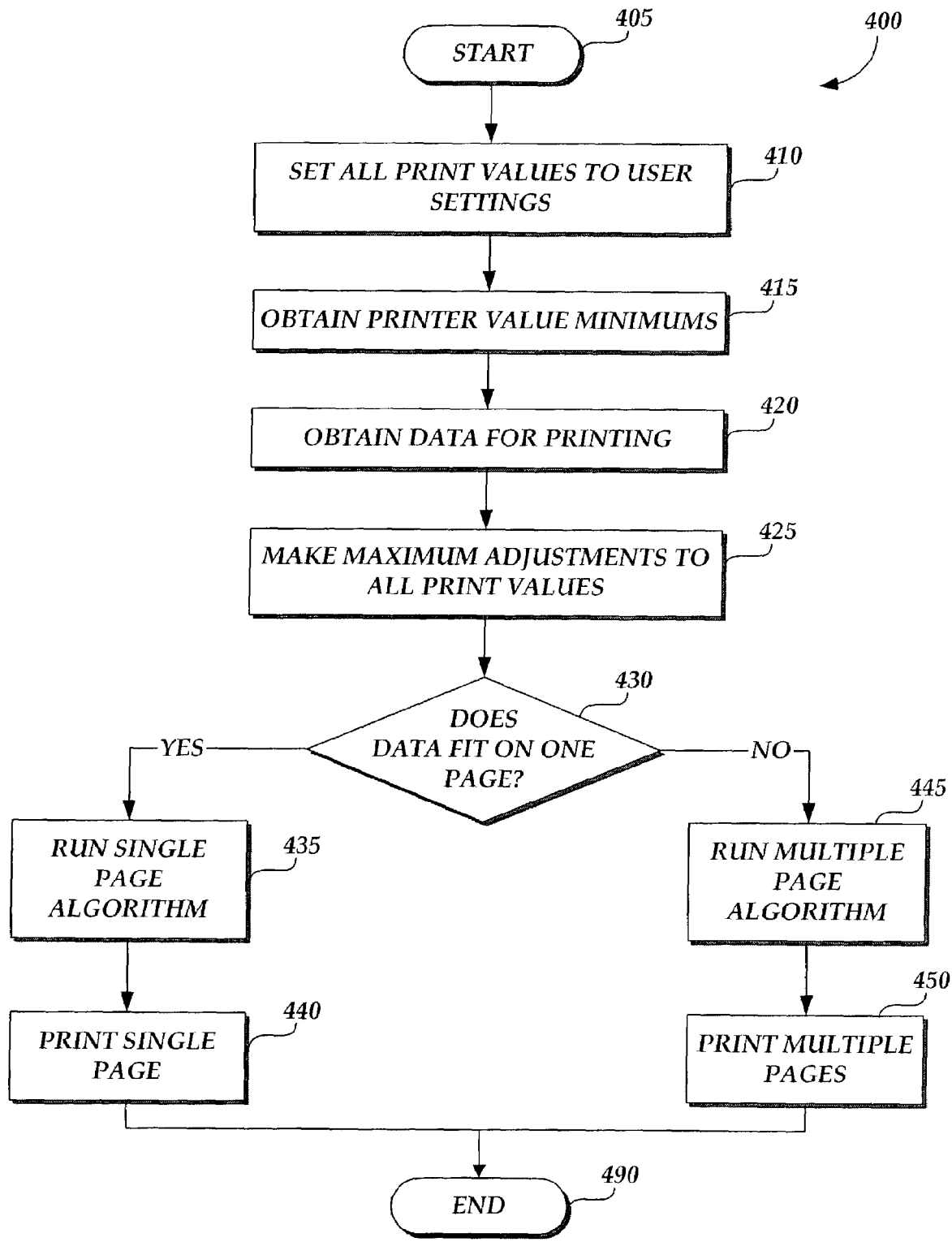
FIG. 4 is a flow chart illustrating a method for optimizing the printing of text, data or images.

FIG. 4 is a flow chart illustrating a method for optimizing the printing of text, data or images. The method 400 illustrated in FIG. 4 begins in step 405 when the user of a handwriting recognition application program 100 for entering text, data or images desires to print a page of text such as the text illustrated in FIG. 2. At step 410, once the user selects the print function of the application 100, a printing program module 37 of the application 100 attempts to optimize the fit of the text to be printed on one or more pages, as required. At step 410, all print settings are initially set to values designated by the user or designated by the application 100. If the user has designated that all printed pages will have a right margin of 1½ inches and that the scale of the printing is 100%, and that the orientation of the printing is in portrait mode, those settings are determined as the initial default settings from which adjustments are made.

At step 415, a determination is made by the printing module 37 as to printer settings allowed by the limitations of the printer software and hardware. As is understood by those skilled in the art, the printing program module 37 may communicate with the printer software via an interface between the printer program module 37 and the printer software to determine allowable printer settings. For example, the printer settings may not allow margins less than one-tenth of an inch from the edge of a particular paper size. For example, if the printer is instructed to print to an 8½ by 11 inch sheet of paper, the printer may be programmed such that no text, data or images may be printed to the very edge of the sheet of paper. Alternatively, the printer software and hardware limitations may allow printing to the very edge of each of the margins of the paper.

At step 425, the printer program module 37 makes a determination as to whether the text, data or images, such as illustrated in FIG. 2, will fit on a single printed page if any unused space is removed and if the margins, orientation and scaling are adjusted to maximum reduction. Any unused space, such as the space 240, to the left or above the text to be printed is removed. Next, beginning with a first orientation, such as portrait, the top, right, left, and bottom margins are reduced to the maximum amount allowable by the printer software and hardware limitations. Finally, the scale of the text is reduced to a maximum allowable level. As should be understood, the scale may be reduced to a level that will render the text or other data unusable. According to one embodiment of the present invention, the maximum reduction in scale is set to 50% scale.

Figure 5:
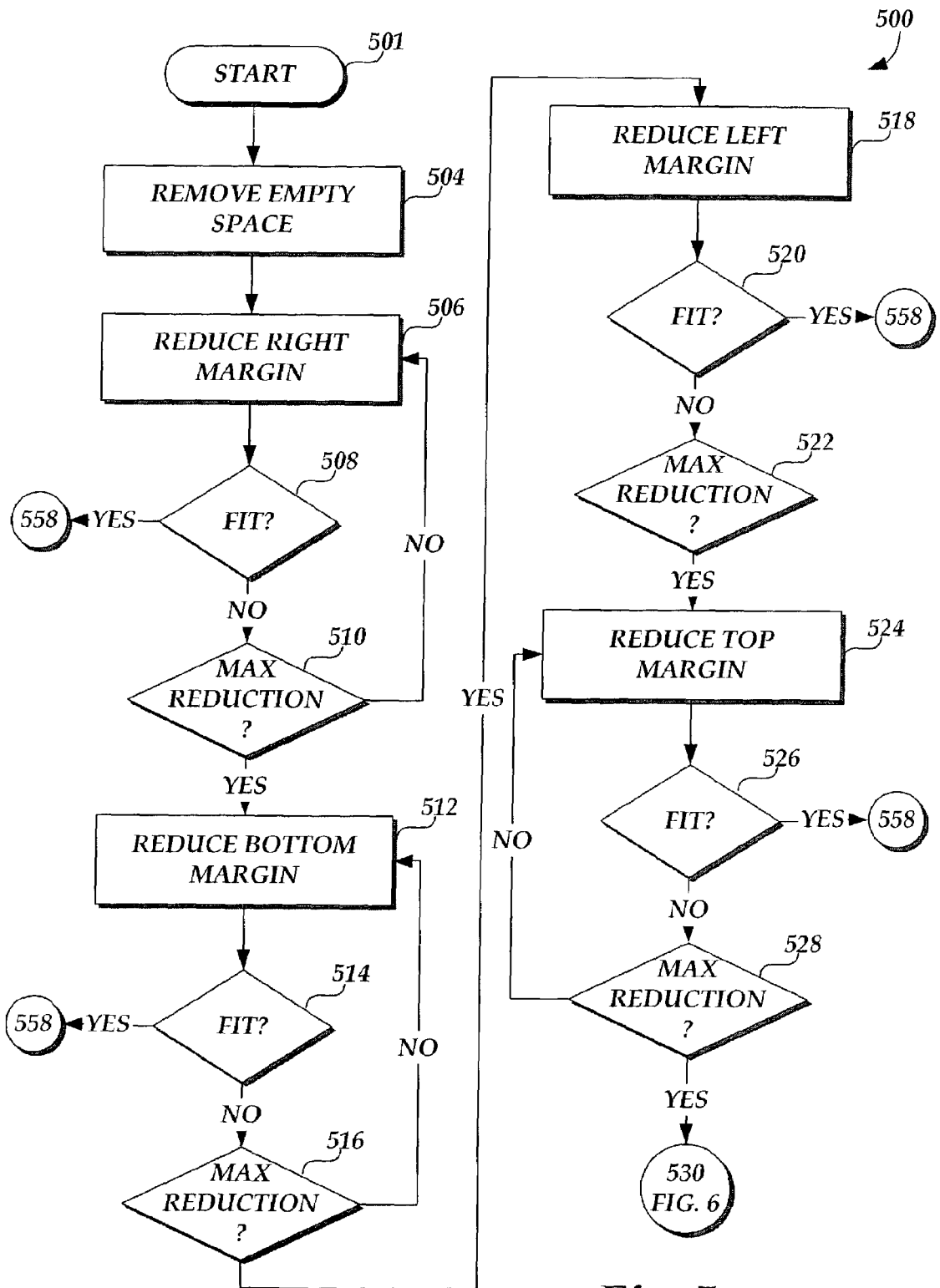
FIGS. 5, 6 and 7 are flow charts illustrating a method of optimizing the printing of text, data or images on a single printed page.
Figure 6:
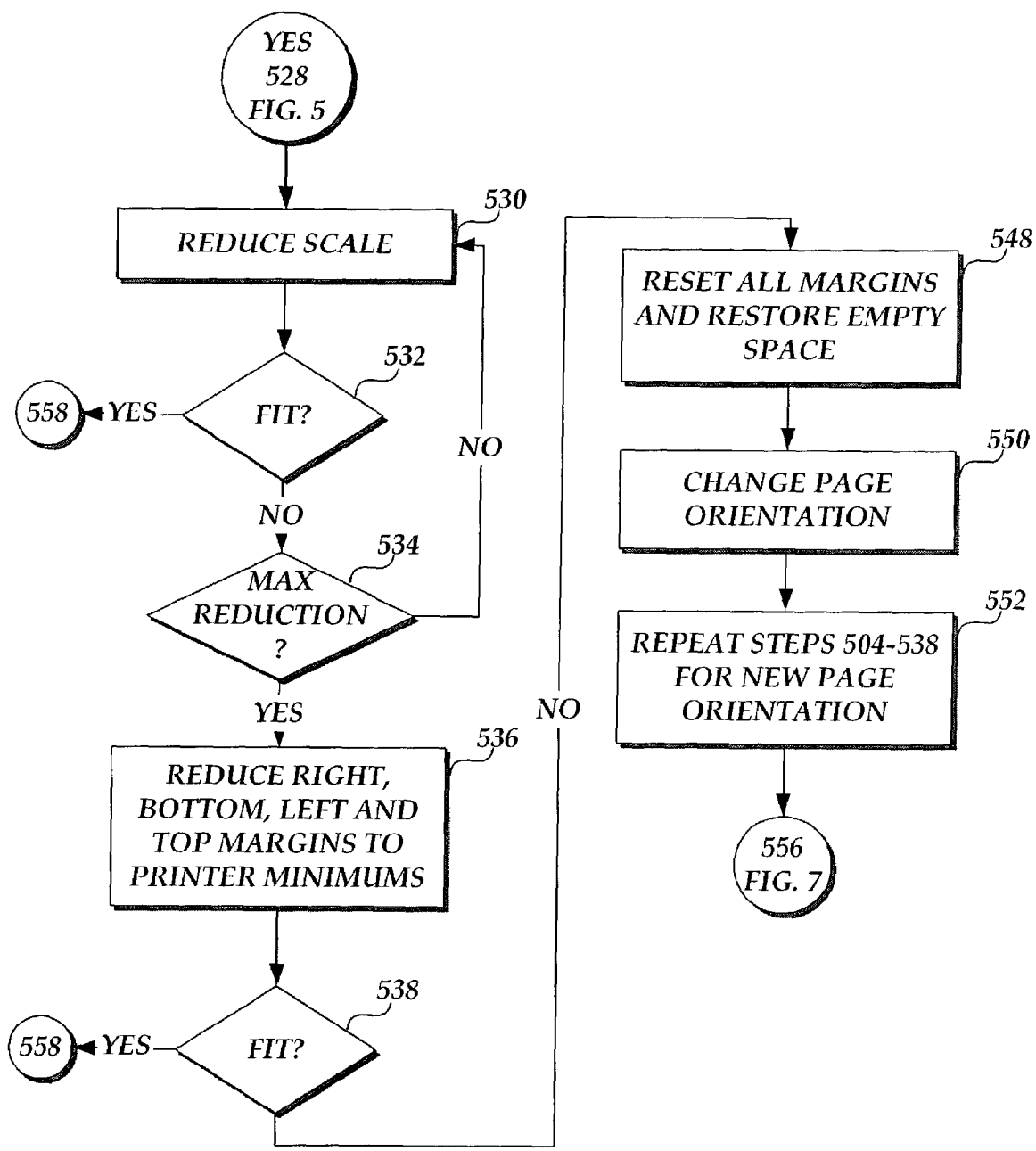
Figure 7:
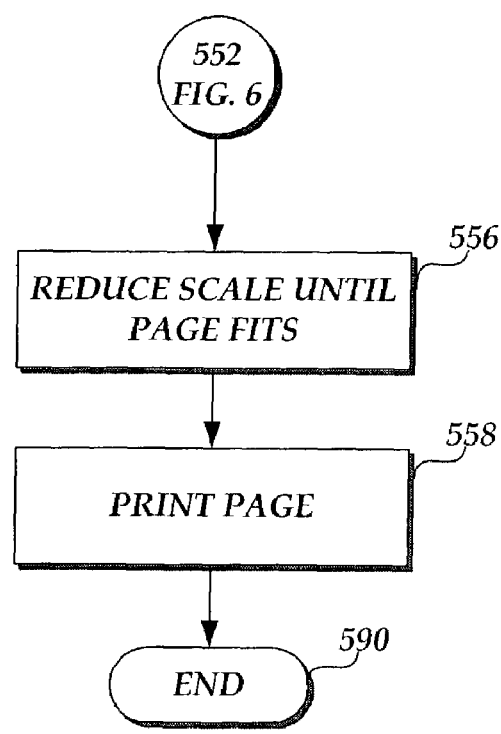
Figure 8:
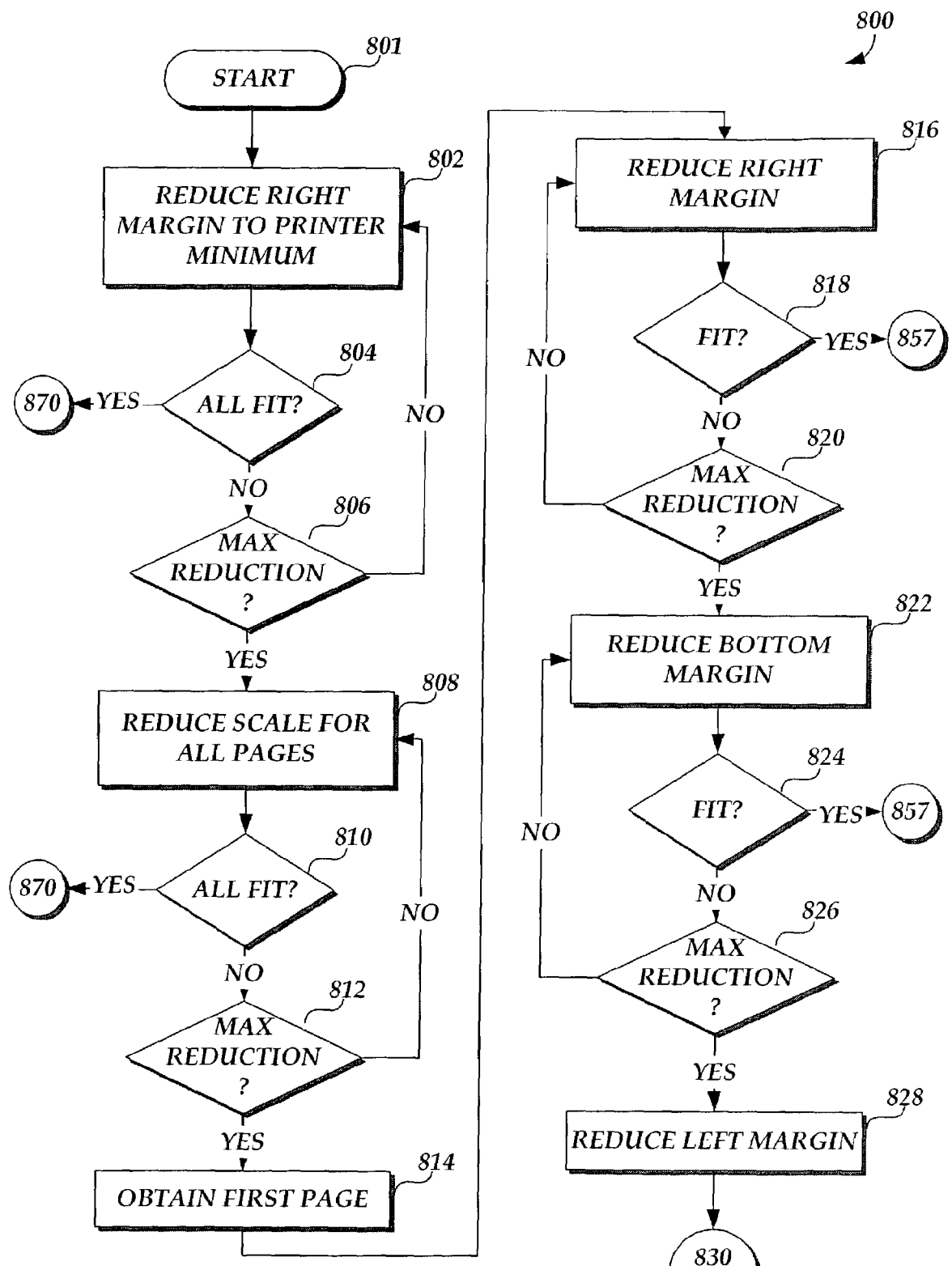
FIGS. 8, 9, 10 and 11 are flow charts illustrating a method for optimizing the printing of text, data, and images on multiple printed pages.
Figure 9:
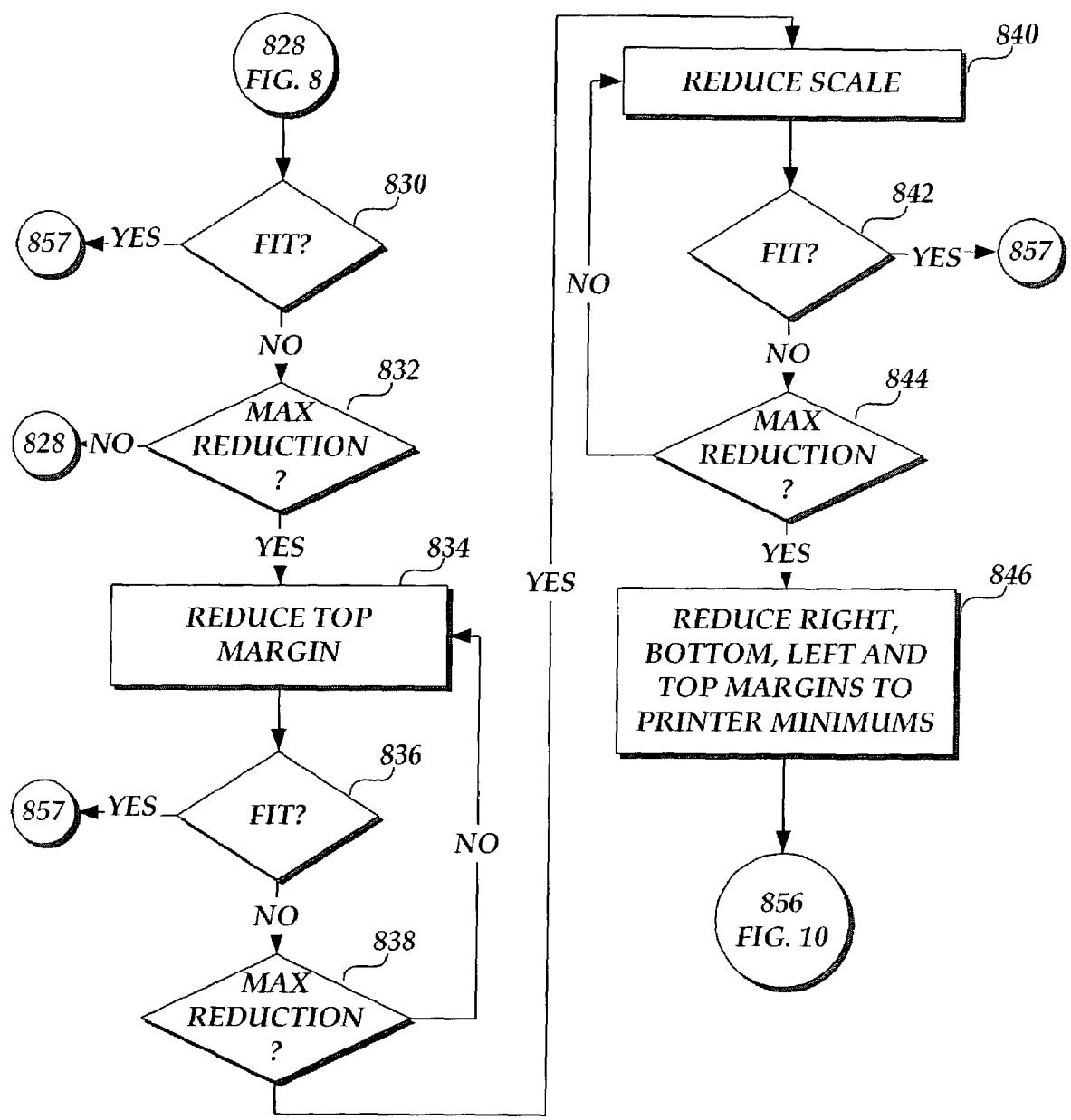
Figure 10:
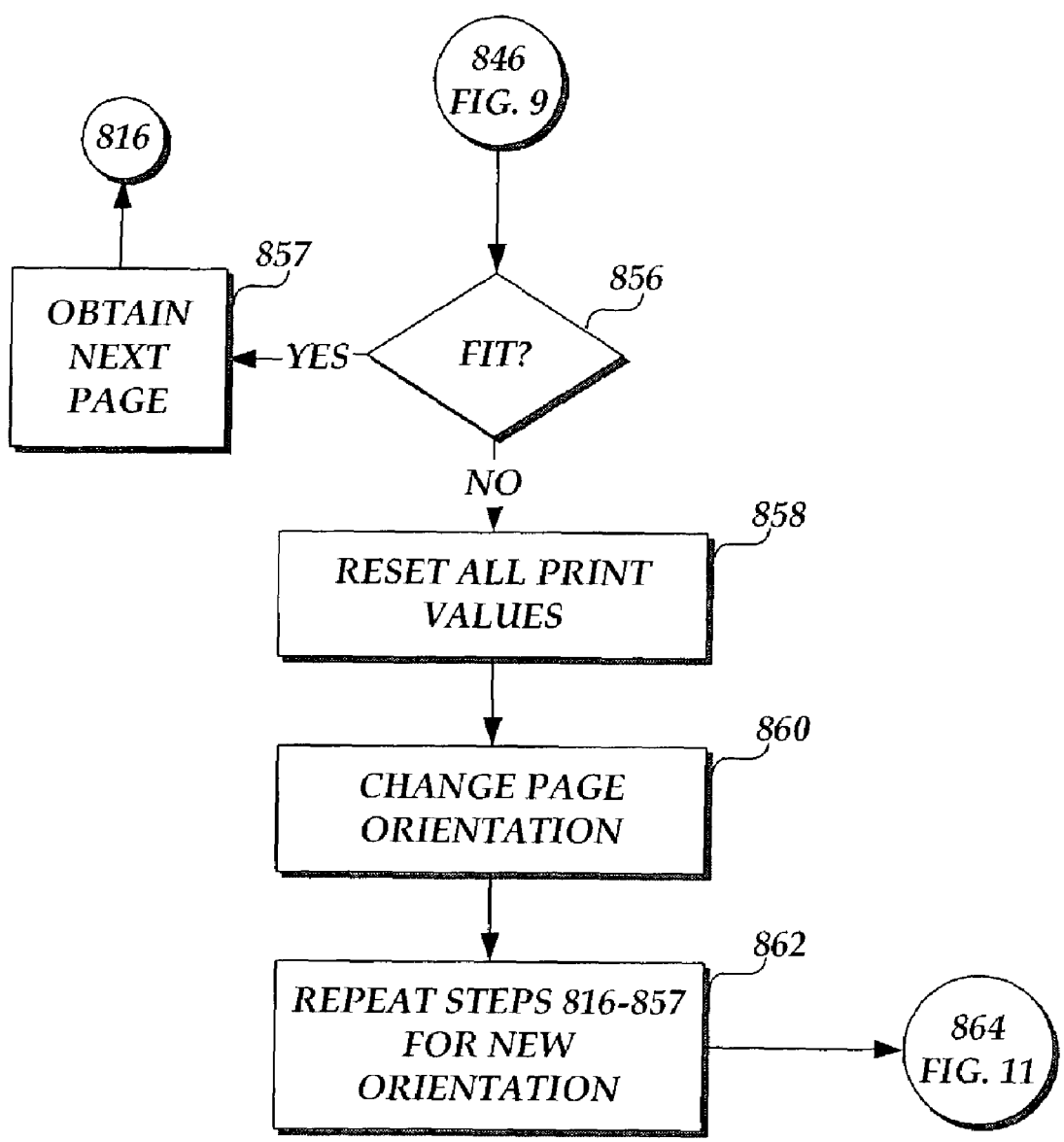
Figure 11:
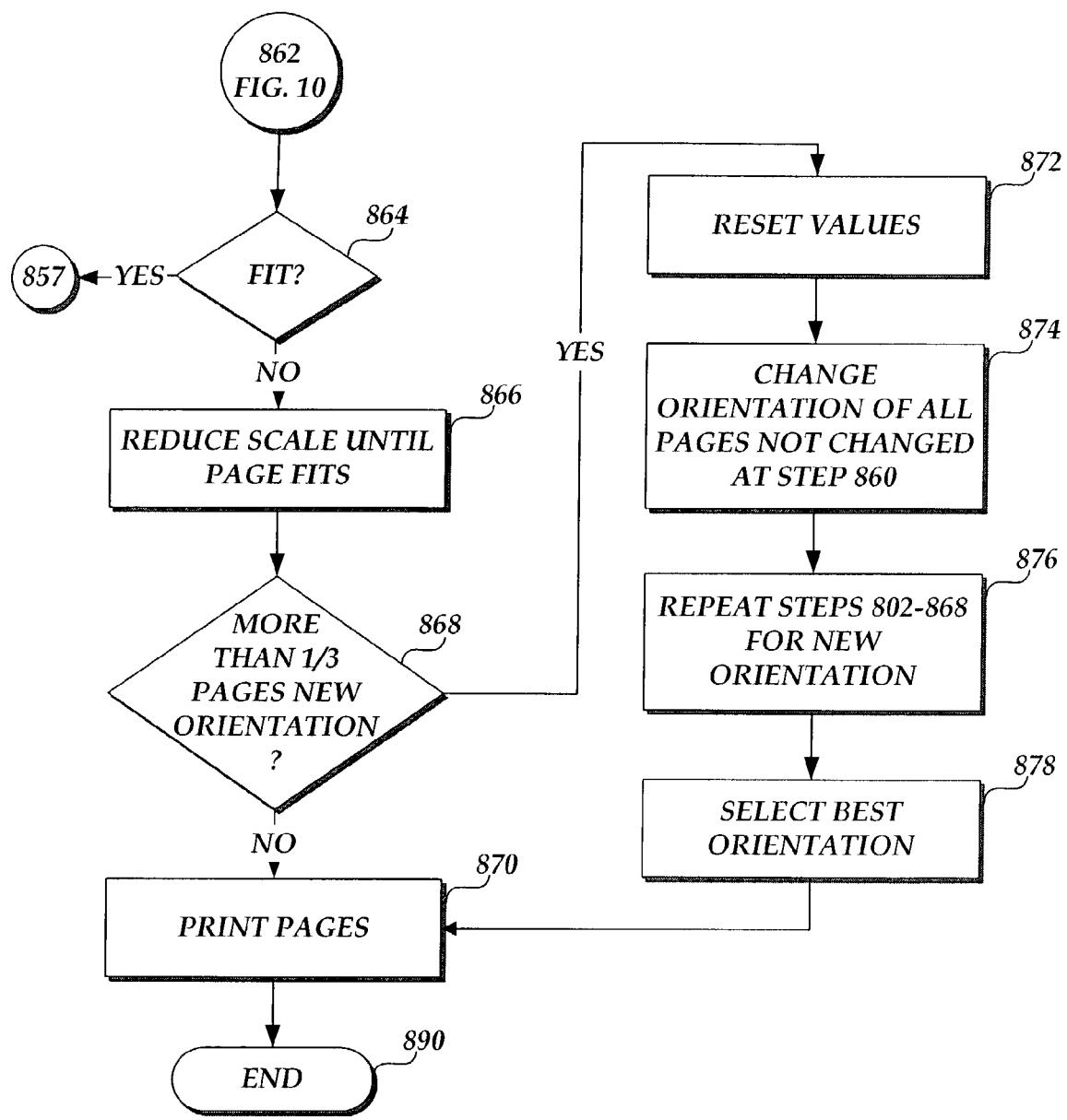

At step 430, after the foregoing adjustments are made, a determination is made as to whether the text or other data to be printed fits on a single page. If yes, the method proceeds to step 435 and the single page printing algorithm, described with reference to FIGS. 5, 6 and 7, is run in order to optimize the fit of the text or other data on a single printed page. However, if the text or other data will not fit on a single page after the maximum adjustments are made in the printing values as step 425, the method proceeds to step 445, and the multiple page printing algorithm, illustrated in FIGS. 8 through 11, is run to optimize the fit of the text or other data on multiple printed pages. At steps 440 and 450, the single page or multiple pages, respectively, are printed. The method ends at step 490.

FIGS. 5, 6 and 7 are flow charts illustrating a method of optimizing the printing of text, data or images on a single printed page. The single page printing method 500 begins at start step 501 and proceeds to step 504. At step 504, any empty or unused space such as the space 240 illustrated in FIG. 2 is removed from the body of material that will be sent to the printer for printing on a printed page. According to a preferred embodiment, in order to establish the boundaries of the unused or empty space to be removed at step 504, the upper left point at which the first text or data originates in the body of text or data to be printed is determined. All space to the left of that point and all space above that point is then designated as empty space and is removed from the body of text or data to be printed. Once the empty space 240 is removed, a determination is made as to whether the text or other data to be printed on the single page will not fit on the single page without additional adjustment. If so, no additional adjustments are made, and the method may proceed to step 558 where the single page or other data is printed.

If the text or other data still will not fit on a single page, the method proceeds to step 506. At step 506, the right margin is reduced slightly in order to make additional room for printed text or data. The incremental reduction in the right margin may be set at different levels. For example, the incremental reduction may be set to an amount equal to the width of a printed character according to the font size or scale size set for the current printing operation. According to one embodiment of the present invention, the incremental margin reduction is one-tenth of one inch. At step 508, after the right margin has been reduced incrementally, a determination is made as to whether the text or other data now fits on a single page for printing. If so, the method proceeds to step 558 as the single page is printed. If not, the method proceeds to step 510 and a determination is made as to whether the maximum allowable reduction in the right margin has been made.

At step 510, a determination is made as to whether a maximum reduction according to user-defined or application-defined settings has been reached. According to one embodiment, the maximum reduction is no less than one-half inch from the right edge of the paper on which the text or data is to be printed. As will be described below, reductions in the right margin out to the limits allowed by the printer software and hardware may be made if required. If the maximum reduction up to user-defined settings has not been reached, the method may proceed back to step 506 for further reduction in the right margin. That is, at step 506, the right margin may be incrementally reduced again in order to optimize the fit of the text or other data on the single page.

Once the right margin has been incrementally reduced to the maximum user or application-defined settings, such as one-half inch, the method proceeds to step 512.

At step 512, the bottom margin is reduced incrementally in order to optimize the fit of the text or other data on the single page. As described with reference to 506, the incremental reduction in the bottom margin may be set to various levels, for example, one-tenth inch, out to a maximum reduction as defined by user or application settings. At step 514, a determination is made as to whether the text or other data fits on the single page for printing after the first incremental reduction in the bottom margin. If so, the method proceeds to step 558, and the single page is printed. If not, the method proceeds to step 516, and a determination is made as to whether the maximum reduction in the bottom margin has been made. If not, the method may proceed back to step 512 where the bottom margin may be further reduced out to the maximum user or application-defined margin setting. If the maximum reduction in the bottom margin has been reached and the text or other data still will not fit on the single page, the method proceeds to step 518.

At steps 518 through 522, the left margin is reduced incrementally in the same manner described for the reduction in the right and bottom margins in an attempt to optimize the fit of the text or other data on a single printed page. If after any incremental reduction in the left margin, the text or the data will fit on a single page, the text or data is printed. If after maximum reductions are made in the left margin without allowing the text or other data to be printed on a single page, the method proceeds to step 524.

At step 524, the top margin is reduced in the same manner as described for the other margins of the paper. The top margin is incrementally reduced until the top margin has been reduced to a maximum user defined margin, such as one-half inch. In the case of all of the margins so reduced, the incremental reduction amounts may be varied such that after each reduction the minimum intrusion on user visual perspective is reached. That is, if it is known that users pay more attention to the top and left margins as compared to the right and bottom margins, the incremental margin reductions levels, for example, one-tenth inch versus one-eight inch, may be varied to achieve an optimum visual presentation of the text or data once it is printed on a printed page.

If the text or other data still will not fit on a single printed page after incremental adjustments are made to the margins of the page, the method proceeds to step 530 illustrated in FIG. 6. At step 530, the scale of the text or data to be printed is reduced by an incremental amount in order to optimize the fit of the text or data on the single page. According to one embodiment, the scale may be reduced by five points per incremental change. That is, if the scale begins at 100%, the first reduction in scale will reduce the scale to 95%. After the first incremental reduction in scale is made, the method proceeds to step 532, and a determination is made as to whether the text or other data now will fit on a single page for printing. If so, the method proceeds to step 558, and the single page is printed. If not, the method proceeds to step 534 and a determination is made as to whether the maximum reduction in scale has been reached. As described briefly above, the scale for the text or data to be printed may be reduced to a point such that the text or data is unreadable or otherwise unusable by the user. According to an embodiment of the present invention, the maximum reduction in the scale at step 530 will reduce the scale to no less than 80%. According to a preferred embodiment, an optimum maximum reduction in scale is between 85–87%.

As illustrated in FIG. 6, the incremental adjustments in the scale of the text or data to be printed is continued between steps 530 and 534 until the text or data fits on a single page or until the maximum reduction in the scale is reached at step 534. If the maximum reduction in scale has been reached in step 534, and the text or other data still will not fit on a single page for printing, the method proceeds to step 536. At step 536, an attempt is made by the printer software module 37 to optimize the fit of the text or other data on to a single page for printing by again adjusting each of the right, bottom, left and top margins. As opposed to the previous reductions in the margins, the reductions in the margins in step 536 include reducing the margins to the maximum margins allowed by the printer software and hardware limitations. For example, if the particular printer in use by the user will not allow printed text to reach the outer edges of the paper on which the text or data is printed, a minimum margin may be imposed. Accordingly, the printer software module 37 may communicate with the printer software to determine the maximum reductions allowable in the right, bottom, left and top margins. According to a preferred embodiment of the present invention, the right margin is first reduced to the maximum allowable reduction, and at step 538, a determination is made as to whether the text or other data now will fit on a single page for printing. If so, the method proceeds to step 558, and the single page is printed. If not, the printer program module 37 next reduces the bottom margin to the maximum allowable margin and again determines whether the text or data now will fit on a single page for printing. This process is repeated for the left and top margins of the page in an attempt to fit the text or other data on a single page for printing.

If the text or data still will not fit on a single page for printing, after reducing all four margins to the maximum allowable margin reductions, the method proceeds to step 548. At step 548, all margins are restored to the original default settings and unused space 240, as illustrated in FIG. 2, is restored. At step 550, the default page orientation is reversed. That is, if the user's default page orientation is portrait orientation, the page orientation for printing the single page of text or other data is changed to landscape orientation. At step 552, steps 504 through 538 are repeated for the new page orientation. That is, now that the page has been changed to a different orientation, for example landscape orientation, any empty space to the left or above the text or data is removed, followed by reductions in the right, bottom, left, and top margins, followed by a reduction in scale, and followed by further reductions in the margins in an attempt to optimize the fit of the text or other data on a single page. It should be understood that if the original print setting had been in the landscape orientation, then at step 552, the printer program module 37 would change the page orientation to the portrait orientation.

At step 556 of FIG. 7, if all attempts to fit the text or other data on to a single page for both page orientations have failed, the method proceeds to step 556. At step 556, the scale of the text or other data is reduced further from the reductions made at steps 530 through 534 until the text or other data fits on a single page. At step 558, the single page is printed, and the method ends at step 590. Referring back to step 556, further reduction of the scale may be performed incrementally to a maximum allowable reduction in scale. As briefly described above, the scale of the text or data should not be reduced to such a point that the text or data is no longer readable or useable by the user. According to an embodiment of the present invention, the maximum scale reduction is 50%. According to one embodiment, the further reduction in scale may be added to previously made margin reductions for a given paper orientation. That is, if the original default orientation was set to portrait orientation, then the final scale reduction at step 556 may take place after all other print setting adjustments have been made up through step 538. Likewise, if the original print orientation was set to landscape orientation, the final scale reduction may be incrementally added to the total print setting adjustments made up to step 552.

As should be understood by the foregoing discussion, the scale reduction at step 556 will fit the text or other data on to a single page because the determination has already been made, as described above with reference to steps 425 and 430 of FIG. 4, that the text or data will fit on a single page if all margins and scale are reduced to maximum reduction levels. However, at step 552, according to an embodiment of the present invention, the final reduction in scale may be made incrementally from the reduced scale level reached at step 534 to a defined maximum scale reduction level, such as 50%.

The foregoing description sets out that all print setting adjustments are made with respect to a first paper orientation, followed by print setting adjustments made to a second paper orientation. According to a preferred embodiment, at each print setting adjustment, for example, adjustment of the right margin at step 506, that adjustment may be made for both a portrait and for a landscape orientation. Accordingly, at each step between steps 530 and 538, each adjustment may be made with respect to alternate paper orientations. Data regarding the result of each of those adjustments may be stored by the printer program module 37 for later use. For example, if it is determined that all the text or data will fit on a single page in landscape orientation after a single adjustment to the right margin, that information is stored by the printer program module 37. Then, after all attempts are made to fit the text or data on a single page portrait orientation, the printing program module 37 need only go back to the stored result for the landscape orientation if it is required to switch to the landscape orientation in order to fit all the text or other data on a single page.

As set forth above with reference to FIG. 4, if the text, data or images to be printed will not fit on a single printed page after maximum adjustments have been made to all print setting values, the printing program module 37 attempts to optimize the fit of the text or other data on multiple printed pages. FIGS. 8, 9, 10 and 11 are flow charts illustrating a method for optimizing the printing of text, data, and images on multiple printed pages. After it has been determined by the printing program module 37 that the text or other data must be printed on multiple pages in order to optimize the fit of the printed text or data, the method 800 illustrated in FIG. 8 begins at start step 801 and proceeds to step 802. At step 802, the right margin for all pages is incrementally reduced in the same manner as described above with reference to FIGS. 5 through 7. At step 804 a determination is made as to whether the text or other data on all the multiple pages now fits on those pages. If so, the method proceeds to step 870, and the multiple pages are printed. If the multiple pages do not fit after the incremental reduction in the right margin, the method proceeds to step 806, and a determination is made as to whether the maximum reduction to the right margin according to the default or user defined minimum margin has been reached. That is, as described above with reference to FIG. 5, if a default setting or a user defined setting requires that the minimum right margin is 1½ inches, the incremental reductions in the right margin at steps 802 through 806 will not reduce the right margin below that level. As described above for the single page printing algorithm, the incremental reduction in the right margin may be defined by the user or may be defined based on some known quantity such as the width of a single character of text.

If the maximum reduction in the right margin has been reached and the text or other data still will not fit on all the multiple pages, the method to step 808, and the scale for all of the multiple pages is reduced incrementally to optimize the fit of the text or data on the multiple pages. At step 810, a determination is made as to whether the text or data on all the multiple pages fits on those pages. That is, a determination is made as to whether any text or data runs beyond any of the margins of the multiple pages. If so, the method proceeds to step 870, and the multiple pages are printed. At step 812, a determination is made as to whether the maximum reduction in the scale has been reached. As described above with reference to FIGS. 5 through 7, the maximum reduction at step 812 is set to a level at which the scale provides a reasonable visual presentation to the user. According to one embodiment, the maximum reduction in scale is 80% scale. According to a preferred embodiment, the scale is reduced no more than to a range of 85–87%.

If the text or other data still will not fit on the multiple pages after steps 802 through 812, the printing software module 37 then attempts to optimize the fit of the text or other data on each page of the set of multiple pages on a page-by-page basis. That is, the printing setting values are adjusted for each individual page of the set of multiple pages to optimize the fit of the text or data designated for printing on each of the individual pages. According to an embodiment of the present invention, unused or empty space, such as the empty space 240 illustrated in FIG. 2, is not removed during the multiple page print algorithm so that the general formatting of the text entered by the user across the multiple pages is maintained. For example, if the user has prepared a handwritten outline using a handwriting recognition software application, the user may have intentionally constructed the outline down the middle of multiple pages leaving an empty space on the left side of the outline for notes. According to this embodiment of the present invention, the empty space is not removed from any individual page or set of multiple pages in order to maintain the integrity of the user defined text or data layout across the several pages.

At step 814, the printing module 37 obtains the first page of the set of multiple pages, and at step 816, the right margin of the first page is incrementally reduced to optimize the fit of the text or data for the first printed page. Steps 816 through 820 are performed to incrementally reduce the right margin of the first page until the text or data either fits on the first page or until the maximum reduction in the right margin has been reached. Performance of steps 816 through 820 are performed in the same manner as steps 506 through 510 described above with reference to FIG. 5. If adjustment of the right margin does not make the text or data designated for the first page fit on the first page, the method proceeds to steps 822 through 838 where adjustments to the bottom, left, and top margins are made incrementally in the same manner and order as described above with reference to steps 512 through 528 of FIG. 5.

If adjustments to the margins do not make the text or data fit on a single page, the method moves to step 840. At step 840, the scale of the text or data to be printed is incrementally reduced in the same manner as described above with reference to steps 530 through 534 of FIG. 6. If incrementally reducing the scale of the individual page allows the text or data to fit into that single page, then the page is ready for printing. If the maximum scale reduction has been reached and the text or data still will not fit on the individual page, the method moves to step 846. At step 846, the right, bottom, left and top margins receive further adjustment out to maximum adjustments allowed by the printer software and hardware limitations in the same manner as described above with reference to step 536 of FIG. 6.

If any of the foregoing adjustments to the print settings for the first individual page cause the text or data to fit on the individual page, the method proceeds to step 857 and the next page of the set of multiple pages is obtained by the printer software module 37 for adjustment. That is, after each individual page is adjusted, the print settings for that individual page are held in buffer until the set of multiple pages are ready for printing. As described above with reference to FIGS. 5 through 7, if the foregoing adjustments do not cause the text or data to fit within the single individual printed page, the method proceeds to step 858 and all print values previously adjusted are reset to the starting values or default values. At step 860, the orientation of the page is changed, and at 862, steps 816 through 857 are repeated for the new orientation. At step 860, if the text or data has not been made to fit the individual printed page according to either page orientation, the method proceeds to step 866, and the scale for both orientations is reduced to a maximum reduction level until the text or other data fits on the individual page. According to a preferred embodiment, if it is required for both page orientations to resort to additional scale reduction at step 866, the page orientation requiring the least amount of scale reduction may be selected as the orientation for printing.

At step 868, after each page of the set of multiple pages has been adjusted so that the text or data designated for printing on each of those pages has been caused to fit for printing, a determination is made as to whether an excessive number of the pages has been changed to a different page orientation than the remaining pages. According to one embodiment, more than one-third of the pages changed to a different orientation is considered excessive. If so, the method proceeds to step 872, and the print setting values for the pages not changed to a new page orientation are reset to the values set for those pages during the best fit analysis for those pages according to the alternate page orientation. That is, as described above, during execution of the method described in FIGS. 8 through 11, the analysis of each individual page for alternate page orientations is preferably performed near simultaneously so that print settings data is accumulated for both orientations at the same time. Accordingly, at step 874, if more than one-third of the pages of the set of multiple pages have been changed to an alternate page orientation, the remaining two-thirds or less of the pages may also be changed to landscape orientation so that the presentation to the user is more desirable. Of course, it is understood, that if more than one-third of the pages have been changed to portrait orientation, it may be desirable to attempt to change the remaining two-thirds or less of the pages to the portrait orientation.

It should be understood that the definition of an acceptable number of pages that may be printed in an alternate page orientation may be defined by the user according to user taste. Accordingly, if it is acceptable to the user to have half the multiple pages in one page orientation and the other half in an alternate orientation, this outcome is a user choice. Referring back to step 868, if the mixture of differing page orientations is acceptable at step 868, the method proceeds to step 870 and the pages are printed. The method ends at step 890.

As set forth above, in the case of multiple page printings, mixed page orientation is a possible outcome. According to an embodiment of the present invention, headers and footers such as the page footer 250, illustrated in FIG. 3, are maintained in the same relative position on the printed page regardless of the change in page orientation. That is, if a footer, such as the page footer 250, is initially entered in a portrait orientation page to be in the bottom center margin, and if that page is changed to landscape orientation, the page footer 250 may be maintained in the same position relative to the page on which the text or data is printed, as opposed to staying in the same position relative to the text or data printed in the alternate page orientation. According to this embodiment, the result allows a user to peruse through printed pages seeing the headers and footers in the same positions relative to the pages on which the text or data are printed without regard to the orientation of the text or data on those pages. Alternatively, if it is desired that headers and footers change orientation when the text or data printed on a page changes orientation, that result may be defined by the user of the printing application module 37.

As described herein, methods and system are provided for automatically adjusting printing settings to optimize the fit of text, data, and/or images on printed pages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of improving the printing of text, data or images on printed pages, comprising the steps of:
    designating a data selection for printing;
    adjusting each of a plurality of print settings to a minimum printer setting for each of the plurality of print settings;
    determining whether the data selection may be printed on one page; if the data selection may be printed on one page;
    incrementally reducing the right, bottom, left, and top margin settings until the data selection fits on one page, or until each of the right, bottom, left, or top margin settings is reduced to a predefined minimum setting;
    after each of the incremental reductions of the right, bottom, left, or top margin settings, determining whether the data selection fits on the one page; and
    if the data selection fits on the one page after any of the incremental reductions of the right, bottom, left, or top margins, printing the data selection on the one page;
    if the data selection does not fit on one page after any of the incremental reductions of the right, bottom, left, or top margins, incrementally reducing the print scale setting using incremental reductions of five percent of the print scale setting until the data selection fits on the one page, or until the print scale setting is reduced to a first minimum setting, wherein after each incremental reduction of the print scale setting, determining whether the data selection fits on the one page, and if the data selection fits on one page, printing the data selection on the one page; and
    if the data selection may not be printed on one page after being reduced to the first minimum setting, designating the data selection for printing on a plurality of pages.

2. The method of claim 1, whereby the step of adjusting each of a plurality of print settings to a minimum printer setting for each of the plurality of print settings includes:
   adjusting right, bottom, left and top margin settings; and
   adjusting a print scale setting.

3. The method of claim 1, whereby if the data selection is designated for printing on a plurality of pages, printing the data selection on the plurality of pages.

4. The method of claim 3, prior to the step of printing the data selection on the plurality of pages, further comprising the steps of:
   incrementally reducing a right margin setting for each page of the plurality of pages until the data selection fits on the plurality of pages, or until the right margin setting is reduced to a predefined minimum setting;
   determining after each incremental reduction of the right margin setting whether the data selection fits on the plurality of pages; and
   if the data selection fits on the plurality of pages after any of the incremental reductions of the right margin setting, printing the data selection on the plurality of pages.

5. The method of claim 4, whereby if the data selection does not fit on the plurality of pages after any of the incremental reductions of the right margin setting,
   incrementally reducing a print scale setting for the data selection for each of the plurality of pages until the data selection fits on the plurality of pages, or until the print scale setting is reduced to a first minimum print scale setting; and
   if the data selection fits on the plurality of pages, printing the data selection on the plurality of pages.

6. The method of claim 5, whereby if the data selection does not fit on the plurality of pages after any of the incremental reductions of the print scale setting, further comprising the steps of:
   for each page of the plurality of pages, incrementally adjusting the plurality of print settings until a portion of the data selection fits on each page of the plurality of pages, or until each of the plurality of print settings is adjusted to the predefined minimum setting.

7. The method of claim 6, whereby if the portion of the data selection does not fit on a corresponding page of the plurality of pages after any incremental adjustments of the plurality of print settings,
   resetting all print settings for the page corresponding to the portion of the data selection to the preferred print settings; and
   for the page corresponding to the portion of the data selection, changing a page orientation to a second page orientation.

8. The method of claim 7, after the step of changing a first page orientation to a second page orientation, comprising the steps of:
   incrementally adjusting the plurality of print settings until the data selection fits on one page in the second page orientation, or until each of the plurality of print settings is reduced to redefined minimum settings;
   if the data selection does not fit on the one page in the second page orientation, incrementally reducing the print scale setting until the data selection fits on one page of the second page orientation, or until the print scale setting reaches the first minimum print scale setting;
   if the data selection does not fit on one page in the second page orientation after incrementally reducing the print scale setting until the data fits on one page or until the print scale setting reaches the first minimum print scale setting, incrementally adjusting the plurality of print settings until the data selection fits on one page in the second page orientation, or until the plurality of print settings are reduced to a minimum printer setting for each of the plurality of print settings.

9. The method of claim 8, whereby if the data selection does not fit on one page in the second page orientation, incrementally reducing the print scale setting until the data selection fits on one page in the second page orientation, or until the print scale setting reaches the first minimum print scale setting.

10. The method of claim 9, whereby if the data selection does not fit on the one page in the second orientation, incrementally reducing the print scale setting until the data fits on the one page in the second orientation, or until the print scale setting reaches a second minimum print scale setting.

11. The method of claim 9, whereby after the data selection is caused to fit the plurality of pages, if more than a predefined percentage of individual pages of the plurality of pages are designated for printing in the second page orientation, changing all the plurality of pages to the second orientation and causing the data selection to fit the plurality of pages in the second orientation.

12. The method of claim 1, prior to the step of printing the data selection on one page, further comprising the steps of:
   resetting the plurality of print settings to a plurality of preferred print settings;
   removing unused space from the left of the data selection;
   removing unused space from above the data selection;
   after removing unused space from the left of the data selection and after removing unused space from above the data selection, determining whether the data selection fits on one page; and
   if the data selection fits on the one page, printing the data selection on the one page.

13. The method of claim 12, whereby the step of removing unused space from the left of the data selection includes removing unused space situated to the left of the left-most portion of the data selection.

14. The method of claim 13, whereby the step of removing unused space from above the data selection includes removing unused space situated to the above of the upper-most portion of the data selection.

15. The method of claim 1, whereby the first minimum setting is not less than eighty (80) percent of the print scale setting.

16. The method of claim 1, whereby the first minimum setting falls within a range of between about 85% and 87% of the print scale setting.

17. The method of claim 1, whereby if the data selection does not fit on one page after any of the incremental reductions of the print scale setting, further comprising the steps of:
   incrementally reducing the right, bottom, left, and top margin settings until the data selection fits on the one page, or until the right, bottom, left, or top margin settings are reduced to a minimum printer setting for each of the right, bottom, left, or top margin settings;
   after each of the plurality of incremental reductions of the right, bottom, left, or top margin settings, determining whether the data selection fits on the one page; and
   if the data selection fits on the one page, printing the data selection on the one page.

18. The method of claim 17, whereby if the data selection does not fit on the one page, incrementally reducing the print scale setting until the data fits on the one page or until the print scale setting reaches a second minimum print scale setting.

19. The method of claim 18, whereby the second minimum setting is not less than fifty (50) percent of the print scale setting.

20. The method of claim 17, whereby if the data selection does not fit on the one page after any incremental reductions of the right, bottom, left, or top margin settings,
resetting the plurality of print settings to a preferred print settings; and
changing a page orientation from a first page orientation to a second page orientation.

21. The method of claim 20, after the step of changing a first page orientation to a second page orientation, comprising the steps of:
removing any unused space from the left of the data selection;
removing any unused space from above the data selection;
incrementally adjusting the plurality of print settings until the data selection fits on one page in the second page orientation, or until each of the plurality of print settings is reduced to predefined minimum settings;
if the data selection does not fit on the one page in the second page orientation, incrementally reducing the print scale setting until the data selection fits on one page of the second page orientation, or until the print scale setting reaches the first minimum print scale setting;
if the data selection does not fit on one page in the second page orientation after incrementally reducing the print scale setting until the data fits on one page or until the print scale setting reaches a the first minimum print scale setting, incrementally adjusting the plurality of print settings until the data selection fits on one page in the second page orientation, or until the plurality of print settings are reduced to a minimum printer setting for each of the plurality of print settings.

22. The method of claim 21, whereby if the data selection does not fit on one page in the second page orientation, incrementally reducing the print scale setting until the data selection fits on one page in the second page orientation, or until the print scale setting reaches the first minimum print scale setting.

23. The method of claim 22, whereby if the data selection does not fit on the one page in the second orientation, incrementally reducing the print scale setting until the data fits on the one page in the second orientation, or until the print scale setting reaches a second minimum print scale setting.

24. The method of claim 23, whereby the second minimum setting is not less than fifty (50) percent of the print scale setting.

25. A computer readable medium containing instructions which when performed by a computer perform a method for optimizing the printing of data on a one page, comprising the steps of:
designating a data selection for printing;
removing unused space from the left of the data selection;
removing unused space from above the data selection;
after removing unused space from the left of the data selection and after removing unused space from above the data selection, determining whether the data selection fits on one page; and
if the data selection fits on the one page,
incrementally reducing the right, bottom, left, and top margin settings until the data selection fits on one page, or until each of the right, bottom, left, or top margin settings is reduced to a predefined minimum setting;
after each of the incremental reductions of the right, bottom, left, or top margin settings, determining whether the data selection fits on the one page; and
if the data selection fits on the one page after any of the incremental reductions of the right, bottom, left, or top margins, printing the data selection on the one page;
if the data selection does not fit on one page after any of the incremental reductions of the right, bottom, left, or top margins, incrementally reducing the print scale setting until the data selection fits on the one page, or until the print scale setting is reduced to a first minimum setting;
after each incremental reduction of the print scale setting, determining whether the data selection fits on the one page;
if the data selection fits on one page, printing the data selection on the one page;
if the data selection does not fit on one page after any of the incremental reductions of the print scale setting,
incrementally reducing the right, bottom, left, and top margin settings until the data selection fits on the one page, or until the right, bottom, left, or top margin settings are reduced to a minimum printer setting for each of the right, bottom, left, or top margin settings;
after each of the plurality of incremental reductions of the right, bottom, left, or top margin settings, determining whether the data selection fits on the one page; and
if the data selection fits on the one page, printing the data selection on the one page; and
if the data selection does not fit on the one page, incrementally reducing the print scale setting until the data fits on the one page or until the print scale setting reaches a second minimum print scale setting.

26. The method of claim 25, whereby if the data selection does not fit on the one page after any incremental reductions of the right, bottom, left, or top margin settings,
resetting the plurality of print settings to a preferred print settings; and
changing a page orientation from a first page orientation to a second page orientation.

27. The method of claim 26, after the step of changing a first page orientation to a second page orientation, comprising the steps of:
removing any unused space from the left of the data selection;
removing any unused space from above the data selection;
incrementally adjusting the plurality of print settings until the data selection fits on one page in the second page orientation, or until each of the plurality of print settings is reduced to predefined minimum settings;
if the data selection does not fit on the one page in the second page orientation, incrementally reducing the print scale setting until the data selection fits on one page of the second page orientation, or until the print scale setting reaches the first minimum print scale setting;

if the data selection does not fit on one page in the second page orientation after incrementally reducing the print scale setting until the data fits on one page or until the print scale setting reaches a the first minimum print scale setting, incrementally adjusting the plurality of print settings until the data selection fits on one page in the second page orientation, or until the plurality of print settings are reduced to a minimum printer setting for each of the plurality of print settings.

28. The method of claim 27, whereby if the data selection does not fit on one page in the second page orientation, incrementally reducing the print scale setting until the data selection fits on one page in the second page orientation, or until the print scale setting reaches the first minimum print scale setting.

29. The method of claim 28, whereby if the data selection does not fit on the one page in the second orientation, incrementally reducing the print scale setting until the data fits on the one page in the second orientation, or until the print scale setting reaches a second minimum print scale setting.

* * * * *

UNITED STATES PATENT AND TRADEMARK OFFICE
CERTIFICATE OF CORRECTION

PATENT NO. : 7,212,309 B1 Page 1 of 1
APPLICATION NO. : 10/233060
DATED : May 1, 2007
INVENTOR(S) : Timothy D. Sellers et al.

It is certified that error appears in the above-identified patent and that said Letters Patent is hereby corrected as shown below:

On the title page, item (56), under "Other Publications" in column 2, line 17, delete "Cmputer" and insert -- Computer --, therefor.

In column 13, line 58, in Claim 8, delete "redefined" and insert -- predefined --, therefor.

In column 15, line 34, in Claim 21, after "reaches" delete "a".

In column 17, line 4, in Claim 27, after "reaches" delete "a".

Signed and Sealed this

Twenty-seventh Day of July, 2010

David J. Kappos
*Director of the United States Patent and Trademark Office*